United States Patent
Podhajny et al.

(10) Patent No.: US 11,656,697 B2
(45) Date of Patent: May 23, 2023

(54) FABRIC SENSING DEVICE

(71) Applicant: Apple Inc., Cupertino, CA (US)

(72) Inventors: Daniel A. Podhajny, Morgan Hill, CA (US); Kathryn P. Crews, Menlo Park, CA (US); Daniel D. Sunshine, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/554,601

(22) Filed: Dec. 17, 2021

(65) Prior Publication Data

US 2022/0107695 A1    Apr. 7, 2022

Related U.S. Application Data

(63) Continuation of application No. 16/926,569, filed on Jul. 10, 2020, now Pat. No. 11,204,656, which is a (Continued)

(51) Int. Cl.
*G06F 3/045* (2006.01)
*G06F 3/041* (2006.01)
(Continued)

(52) U.S. Cl.
CPC ............ *G06F 3/041* (2013.01); *D03D 15/00* (2013.01); *G06F 3/044* (2013.01); *G06F 3/045* (2013.01);
(Continued)

(58) Field of Classification Search
CPC .... G06F 3/041; G06F 3/0416; G06F 3/04166; G06F 3/044; G06F 3/0443; G06F 3/0445;
(Continued)

(56) References Cited

U.S. PATENT DOCUMENTS 3,414,666 A    12/1968   Doundoulakis et al.
3,711,627 A    1/1973    Maringulov
(Continued)

FOREIGN PATENT DOCUMENTS

CN    1430765 A    7/2003
CN    1882280 A    12/2006
(Continued)

OTHER PUBLICATIONS

Geoff Walker, S3: Fundamentals of Touch Technologies and Applications, SID 2012 Short Course, Jun. 3, 2012, pp. 26-29, Walker Mobile, LLC, Milpitas, CA, United States.

*Primary Examiner* — Joe H Cheng
(74) *Attorney, Agent, or Firm* — Kendall P. Woodruff

(57) ABSTRACT

A touch-sensitive textile device that is configured to detect the occurrence of a touch, the location of a touch, and/or the force of a touch on the touch-sensitive textile device. In some embodiments, the touch-sensitive textile device includes a first set of conductive threads oriented along a first direction, and a second set of conductive threads interwoven with the first set of conductive threads and oriented along a second direction. The device may also include a sensing circuit that is operatively coupled to the first and second set of conductive threads. The sensing circuit may be configured to apply a drive signal to the first and second set of conductive threads. The sensing circuit may also be configured to detect a touch or near touch based on a variation in an electrical measurement using the first or second set of conductive threads.

20 Claims, 8 Drawing Sheets

Related U.S. Application Data continuation of application No. 16/417,414, filed on May 20, 2019, now Pat. No. 10,739,924, which is a continuation of application No. 15/514,452, filed as application No. PCT/US2015/050420 on Sep. 16, 2015, now Pat. No. 10,338,755.

(60) Provisional application No. 62/058,027, filed on Sep. 30, 2014.

(51) Int. Cl.
*G06F 3/044* (2006.01)
*D03D 15/00* (2021.01)

(52) U.S. Cl.
CPC .......... *G06F 3/0416* (2013.01); *G06F 3/0443* (2019.05); *G06F 3/0445* (2019.05); *G06F 3/0446* (2019.05); *G06F 3/04166* (2019.05)

(58) Field of Classification Search
CPC ...... G06F 3/0446; G06F 3/045; G06F 3/0488; G06F 2203/04102; D03D 1/008; D03D 7/00; D03D 11/00; D03D 15/00; D10B 2401/16; D10B 2401/18; D10B 2403/021
See application file for complete search history.

(56) References Cited

U.S. PATENT DOCUMENTS

| | | | |
|---|---|---|---|
| 4,659,873 A * | 4/1987 | Gibson | H01H 3/141 178/18.05 |
| 6,210,771 B1 | 4/2001 | Post et al. | |
| 7,365,031 B2 | 4/2008 | Swallow et al. | |
| 7,544,627 B2 | 6/2009 | Tao et al. | |
| 8,945,328 B2 * | 2/2015 | Longinotti-Buitoni | A61B 5/6805 156/247 |
| 10,338,755 B2 | 7/2019 | Podhajny et al. | |
| 10,739,924 B2 | 8/2020 | Podhajny et al. | |
| 2002/0121146 A1 | 9/2002 | Manaresi et al. | |
| 2003/0129905 A1 * | 7/2003 | Dhawan | H05K 7/06 442/377 |
| 2003/0211797 A1 | 11/2003 | Hill et al. | |
| 2004/0057176 A1 | 3/2004 | Dhawan et al. | |
| 2004/0174337 A1 * | 9/2004 | Kubota | G06F 3/016 345/156 |
| 2005/0069695 A1 | 3/2005 | Jung et al. | |
| 2005/0095934 A1 | 5/2005 | Serban | |
| 2006/0281382 A1 | 12/2006 | Karayianni et al. | |
| 2007/0089800 A1 | 4/2007 | Sharma | |
| 2008/0050550 A1 | 2/2008 | Orth | |
| 2009/0018428 A1 | 1/2009 | Dias et al. | |
| 2011/0059769 A1 | 3/2011 | Brunolli | |
| 2011/0074380 A1 | 3/2011 | Jeon | |
| 2012/0069486 A1 | 3/2012 | Lee et al. | |
| 2013/0008554 A1 | 1/2013 | Fisher et al. | |
| 2013/0027362 A1 | 1/2013 | Lee et al. | |
| 2013/0262298 A1 | 10/2013 | Morley | |
| 2013/0285972 A1 | 10/2013 | Elias et al. | |
| 2014/0150573 A1 | 6/2014 | Cannard et al. | |
| 2015/0164420 A1 | 6/2015 | Huang et al. | |
| 2015/0185944 A1 * | 7/2015 | Magi | G06F 3/016 345/173 |
| 2016/0048235 A1 | 2/2016 | Poupyrev | |
| 2016/0058375 A1 * | 3/2016 | Rothkopf | A61B 5/0261 600/323 |

FOREIGN PATENT DOCUMENTS

| | | |
|---|---|---|
| CN | 202142042 U | 2/2012 |
| CN | 102541376 A | 7/2012 |
| CN | 102681715 A | 9/2012 |
| CN | 103336636 A | 10/2013 |
| CN | 203776213 U | 8/2014 |
| EP | 2511804 A1 | 10/2012 |
| JP | H07216690 A | 8/1995 |
| JP | H08-076910 A | 3/1996 |
| JP | 2003-529901 A | 10/2003 |
| JP | 2006234716 A | 9/2006 |
| JP | 2006-528897 A | 12/2006 |
| JP | 2011086114 A | 4/2011 |
| JP | 2011102457 A | 5/2011 |
| JP | 2013016069 A | 1/2013 |
| JP | 2015518579 A | 7/2015 |
| KR | 20130081762 A | 7/2013 |
| KR | 20140089935 A | 7/2014 |
| WO | 2016025554 A1 | 2/2016 |

* cited by examiner

FABRIC SENSING DEVICE

This application is a continuation of patent application Ser. No. 16/926,569, filed Jul. 10, 2020, now U.S. Pat. No. 11,204,656, which is a continuation of patent application Ser. No. 16/417,414, filed May 20, 2019, now U.S. Pat. No. 10,739,924, which is a continuation of patent application Ser. No. 15/514,452, now U.S. Pat. No. 10,338,755, filed Mar. 24, 2017, which is a national stage application, filed under 35 U.S.C. § 371, of international patent application No. PCT/US2015/050420, filed Sep. 16, 2015, which claims the benefit of provisional patent application No. 62/058,027, filed Sep. 30, 2014, all of which are incorporated by reference herein in their entireties.

TECHNICAL FIELD

The following disclosure generally relates to touch-sensitive devices and, more specifically, a textile-based touch-sensitive device.

BACKGROUND

Traditional electronic devices may include a variety of input devices, including buttons, keys, mice, trackballs, joysticks, and the like. Some traditional electronic devices may include a touch panel or touch screen that is configured to receive a touch input from a user. However, many traditional input devices and touch sensors are formed using rigid materials and/or a rigid substrate sheet and, therefore, may be limited to certain form factors. Therefore, it may be advantageous that input devices be formed from flexible materials that may be more easily adapted for use in a variety of applications.

SUMMARY

Some example embodiments are directed to a touch-sensitive textile device that is configured to detect changes in capacitive coupling with an object touching the textile. In some embodiments, the touch-sensitive textile device includes a first set of conductive threads oriented along a first direction, and a second set of conductive threads interwoven with the first set of conductive threads and oriented along a second direction. The device may also include a sensing circuit that is operatively coupled to the first and second set of conductive threads. The sensing circuit may be configured to apply a drive signal to the first and second set of conductive threads to produce a charge on each of the first and second set of conductive threads. The sensing circuit may also be configured to detect a variation in charge or on any one of the first and second set of conductive threads. In some embodiments, the sensing circuit is configured to detect a variation in the capacitive coupling due to an object touching or nearly touching the touch-sensitive textile device. The sensing circuit may be configured to detect a touch or near touch on the first or second set of conductive threads based on the variation in charge. The sensing circuit may also be configured to determine a location of the touch based on the variation in charge.

In some embodiments, the touch-sensitive textile device includes a woven textile component comprising: the first and second set of conductive threads, and a set of nonconductive threads interwoven with the first and second set of conductive threads. In some embodiments, a group nonconductive threads are oriented along the first direction forming a nonconductive strip region. The first set of conductive threads may include a group conductive threads forming a conductive strip region that is adjacent to the nonconductive strip region. In some embodiments, nonconductive strip regions and conductive strip regions are arranged in an alternating pattern in both the first and second directions.

Some example embodiments are directed to a touch-sensitive textile device that is configured to detect changes in resistance or impedance due to an object touching the textile. In some embodiments, the touch-sensitive textile device includes a first set of conductive threads oriented along a first direction, and a second set of conductive threads interwoven with the first set of conductive threads and oriented along a second direction. The device may also include a sensing circuit that is operatively coupled to the first and second set of conductive threads. The sensing circuit may be configured to apply a drive signal to the first and second set of conductive threads. The sensing circuit may also be configured to detect a variation in resistance between any one of the first set of conductive threads and any one of the second set of conductive threads. In some embodiments, the sensing circuit may be configured to sense a touch on the first or second set of conductive threads based on the variation in resistance. In some embodiments, the sensing circuit may be further configured to determine a location of the touch based on the variation in resistance.

Some example embodiments are directed to a touch-sensitive textile device that is configured to detect changes in resistance or impedance between two textile layers due to an object touching the textile. In some embodiments, the touch-sensitive textile device includes a first set of conductive threads disposed in a first textile layer, and a second set of conductive threads disposed in a second textile layer. The touch-sensitive textile may also include a spacer structure separating the first and second textile layers. The spacer structure may be configured to deflect in response to a touch on the first or second textile layer. In some embodiments, the spacer structure is a monofilament yarn interwoven between the first and second textile layers.

The device may also include a sensing circuit that is operatively coupled to the first and second set of conductive threads. The sensing circuit may be configured to apply a drive signal to the first and second set of conductive threads. The sensing circuit may also be configured to detect a variation in resistance between any one of the first set of conductive threads and any one of the second set of conductive threads. In some embodiments, the sensing circuit may be configured to sense a touch on the first or second textile layers based on the variation in resistance. In some embodiments, the sensing circuit may be further configured to determine a location of the touch based on the variation in resistance.

Some example embodiments are directed to a touch-sensitive textile device that is configured to detect the force of a touch based on changes in capacitance between two textile layers. In some embodiments, the touch-sensitive textile device includes a first set of conductive threads disposed in a first textile layer, and a second set of conductive threads disposed in a second textile layer. The touch-sensitive textile may also include a spacer structure separating the first and second textile layers. The spacer structure may be configured to deflect in response to a touch on the first or second textile layer. In some embodiments, the spacer structure is a monofilament yarn interwoven between the first and second textile layers.

The device may also include a sensing circuit that is operatively coupled to the first and second set of conductive threads. The sensing circuit may be configured to apply a drive signal to the first and second set of conductive threads. The sensing circuit may also be configured to detect a variation in capacitance between any one of the first set of conductive threads and any one of the second set of conductive threads. In some embodiments, the sensing circuit may be configured to detect the fore of touch on the first or second textile layers based on the variation in capacitance.

DETAILED DESCRIPTION

Figure 1:
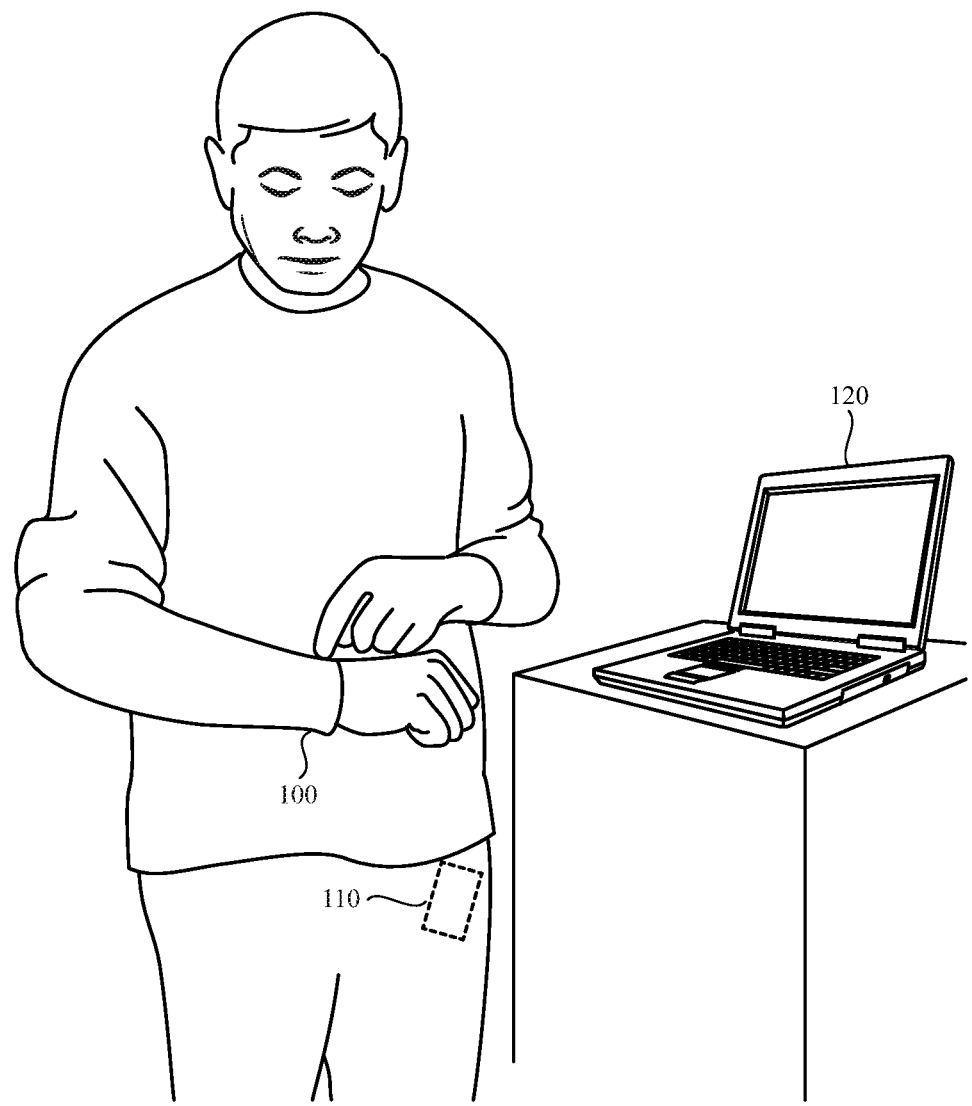
FIG. 1 depicts an example system of devices including a touch-sensitive textile device.

Embodiments described herein are generally directed to touch-sensitive textiles that may be used to receive touch input on a variety of consumer products. In particular, the devices and techniques described herein may be applied to a variety of textile materials that may be incorporated into consumer electronic products, articles of clothing, clothing accessories, handbags, upholstered items, household textiles, and other items that may include a textile component or element. The following disclosure is directed to techniques for creating touch-sensitive textiles for receiving a variety of user touch input.

In general, it may be advantageous to implement touch-sensitive functionality using a broad range of materials that can be integrated into a number of flexible and versatile form factors. In some implementations, a touch-sensitive textile may be incorporated into a consumer electronic product, including for example, a wearable electronic device. For example, the touch-sensitive textile may be incorporated into a portion of the band or lanyard that is used to secure the device to the body of a user. A touch-sensitive textile may also be incorporated into an article of clothing such as a shirt, jacket, glove, or other textile-based garment. For example, a touch-sensitive textile may be incorporated into a sleeve, pocket, or other portion of a garment that is readily accessible to the use. In some embodiments, a touch-sensitive textile may be incorporated into an accessory, including, for example, a purse, wallet, handbag, backpack, and or other accessory having including textile element. A touch-sensitive textile may also be incorporated into an item that is not worn, including, for example, a cloth, rug, tapestry, upholstery, or other fabric-based article or component.

The touch-sensitive textile may be incorporated or integrated with other electronic components or electronic circuitry to form a touch-sensitive textile device. In some implementations, a touch-sensitive textile device may be configured to recognize a touch gesture or gestures on a surface of the textile. The touch gesture(s) may include a sweep or movement of the user's finger across the surface of the textile that may be interpreted as a command or other user input. In some implementations, the touch-sensitive textile device may be configured to detect and measure the force of a touch on the textile, which may be used to interpret additional user inputs and/or commands. The touch-sensitive textile device may also be incorporated into or configured to interface with an electronic device to provide user input to programs or instructions being executed on the electronic device.

In some embodiments, the touch-sensitive textile may include a capacitive touch sensor that is configured to detect and estimate a location of a touch or near touch on the surface of the textile. In some implementations, the touch-sensitive textile include two sets of conductive threads that are oriented transverse to each other within a textile material. The conductive threads may be operatively coupled to a sensing circuit that is configured to produce and monitor an electrical charge on each of the conductive threads in the touch-sensitive textile. When an object, such as the user's finger, comes close to the conductive threads, the electrical charge may be dissipated or discharged, which may be detected by the sensing circuit. By determining which conductive threads have been discharged, the sensing circuit (or other processing unit) may be used to estimate the location of the touch on the textile material.

In some embodiments, the touch-sensitive textile may include a resistive touch sensor that is configured to text and estimate the location of a touch on the surface of the textile. In some implementations the touch-sensitive textile includes two sets of conductive threads that are interwoven within the textile, each set generally oriented transverse to the other. A touch, such as a finger, may contact the surface a thread from each set of conductive threads, which may reduce or change the resistance or impedance between the two threads. The reduced resistance or impedance caused by the touch may be detected by a sensing circuit that is configured to monitor and detect resistance and/or impedance between pairs of conductive threads. Additionally, by determining which threads are associated with the change in resistance or impedance, the sensing circuit (or other processing unit) may be used to estimate the location of the touch on the surface of the textile material.

In some embodiments, the touch-sensitive textile may include a two-layer touch sensor separated by a spacer, such as a monofilament yarn. Each layer of the textile may include a set of conductive threads. The spacer layer may compress or deform in response to a touch on the textile, which, in some cases, causes conductive threads from each of the layers to come into contact with each other. The contact between the conductive threads may cause a change in the electrical resistance or impedance between the layers, which may be detected by a sensing circuit. As in the previous examples, by determining which threads are associated with the change in resistance or impedance, a sensing circuit (or other processing unit) may be used to estimate the location of the touch on the textile material.

In some embodiments, the touch-sensitive textile may include a two-layer capacitive force sensor with each layer including a set of conductive threads, the two layers separated by a compressible spacer, such as a monofilament yarn. When a force is applied to the surface of the textile, the two layers may be forced closer together resulting in a change in capacitance between pair of conductive threads in the two layers. In some implementations, the capacitance between pairs of conductive threads in the two layers may be monitored by a sensing circuit, which may be adapted to estimate a force on the textile based on the change in capacitance.

One or more of the sensing configurations described above may be integrated with a touch-sensitive textile device or component that is configured to produce a touch output that can be interpreted as a command or other user input to an electronic device or system. In some implementations, the touch-sensitive textile device or component is used to receive user input for one or more of a variety of different electronic devices. By way of example and not limitation, a touch-sensitive textile device or component can be used to provide user input to a mobile telephone, a portable media player, a wearable electronic device, a tablet computing device, a notebook computing device, a desktop computing device, a television, an electronic appliance, or other electronic device or system.

FIG. 1 depicts an example system of devices including a touch-sensitive textile device 100. In particular, FIG. 1 depicts a touch-sensitive textile device that is incorporated into an article of clothing that can be worn by a user. In the example depicted in FIG. 1, the touch-sensitive textile device is incorporated into the sleeve of a garment. However, as described previously, in other examples, the touch-sensitive textile device may be incorporated into a bracelet, a wrist band, arm band, scarf, or other wearable item. In addition, the touch-sensitive textile device may be incorporated into a variety of other articles that are not worn by the user including, for example, a cloth, rug, tapestry, upholstery, purse, backpack, lanyard, or other fabric-based article or component.

In some embodiments, the touch-sensitive textile device 100 may be configured to work with a variety of electronic devices. In the example depicted in FIG. 1 a touch-sensitive textile device 100 may be configured to provide user input to a mobile electronic device 110 and/or a computing device 120. In the present example, the mobile electronic device 110 is a mobile telephone. In some embodiments, the mobile electronic device 110 may include a portable media player, wearable electronic device, or other mobile device. As shown in FIG. 1, the computing device 120 a notebook computer system. In some embodiments, the computing device 120 may include a desktop computer system, a server computing system, remote computer system connected by a communications network, or other computing device.

As shown in FIG. 1, the touch-sensitive textile device 100 may be configured to relay a user's touch on the touch-sensitive textile device 100 to the mobile electronic device 110 and/or the computing device 120 where it may be interpreted as a command or user input. For example, a touch gesture or other type of touch command may be performed by touching the surface of the touch-sensitive textile device 100, as shown in FIG. 1. In this example, the user performs the touch input by contacting the portion of the sleeve that is touch sensitive using a finger or other detectable object. The gesture or touch command performed on the touch-sensitive textile device 100 may be translated into a command or acknowledgement that is communicated to the mobile electronic device 110 and/or the computing device 120.

In one example, the mobile electronic device 110 may produce an alert output that includes an audio, haptic, and/or visual output. Because the mobile electronic device 110 is located in the user's pants pocket, the mobile electronic device 110 may not be immediately accessible to the user. To acknowledge the receipt of the alert output, the user may perform a touch-based gesture or other touch input on the surface of the touch-sensitive textile device 100. The touch-sensitive textile device 100 may then produce an output that is communicated to the mobile electronic device 110 indicating that the user has received and acknowledged the alert. In response to the acknowledgement, the mobile electronic device 110 may perform additional actions and/or conclude or silence the alert output.

In some embodiments, the touch-sensitive textile device 100 may be used to provide a command to the mobile device 110 and/or the computing device 120. For example, the user may perform a gesture that corresponds to a command to initiate a communication using the mobile device 110 and/or the computing device 120. In some cases, the user command may include instructions to initiate an e-mail, SMS, or other communication using a predetermined message that corresponds to the gesture entered on the surface of the touch-sensitive textile device 100. When the user enters the touch gesture on the touch-sensitive textile device 100, a communication may be sent to the mobile device 110 and/or the computing device 120 initiating the communication.

In some embodiments, the user command may include instructions to enter a do-not-disturb mode, which silences alerts from either the mobile device 110 or the computing device 120. The user command may also include instructions to enter or invoke a secure mode that requires a pass code or other authentication to perform certain functionality on either the mobile device 110 or the computing device 120. More generally, a touch on the touch-sensitive textile device 100 may be used to invoke a variety of user commands that may be performed and/or interpreted by the mobile device 110, the computing device 120, or any other electronic device in communication with the touch-sensitive textile device 100.

In some embodiments, the touch-sensitive textile device 100 may be used to control a program or operation being performed on the mobile electronic device 100 or the computing device 120. For example, the touch-sensitive textile device 100 may be used to control the volume of an audio output for either the mobile electronic device 100 or the computing device 120. The touch-sensitive textile device 100 may also be used to select the next track or index a media item to a next item during a media playback. In the present example the mobile electronic device 100 is placed in the pants pocket of the user and may not be immediately accessible to the user. However, because the touch-sensitive textile device 100 is incorporated into the sleeve of the user's garment, touch-based user control may always be within immediate reach of the user.

As discussed briefly above, the touch-sensitive textile device may include a variety of sensing techniques for detecting a touch and/or the force of a touch on the surface of the textile. FIGS. 2A-B through 5A-B depict example sensing techniques that can be used to detect and interpret a touch input on the surface of a textile. While the following examples are provided with respect to a woven-type of cloth textile, similar principles may be applied to textiles having a different composition, including, for example, knit textiles, lace textiles, mesh textiles, and so on.

Figure 2A:
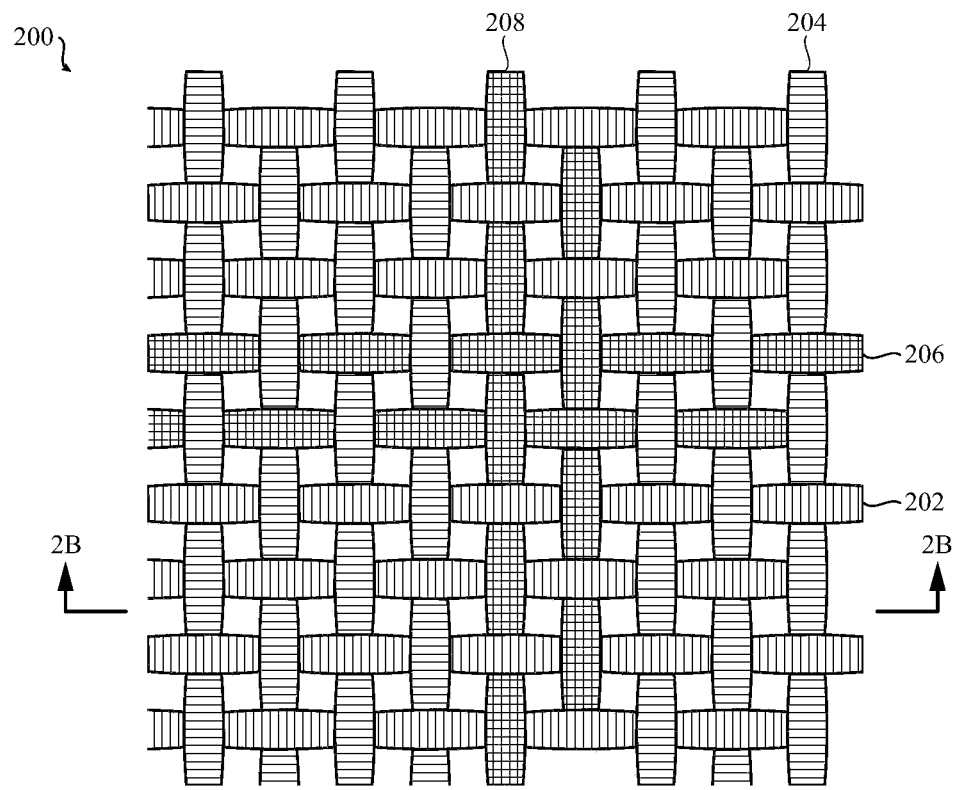
FIGS. 2A-B depict an example self-capacitive touch-sensitive textile device in accordance with some embodiments.
Figure 2B:
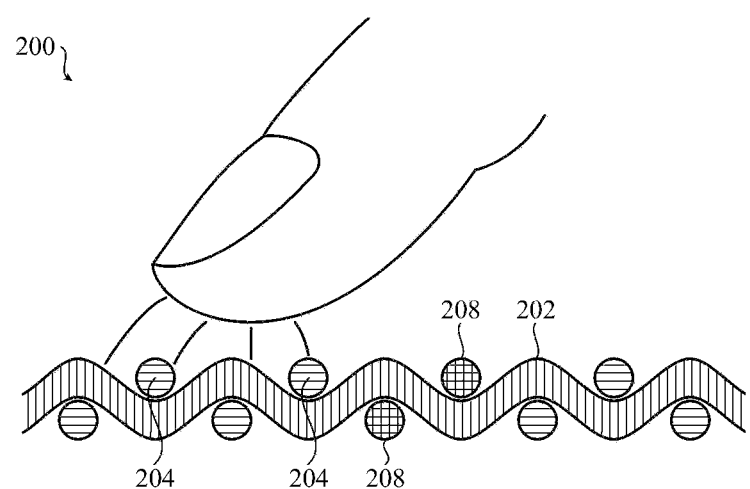

FIGS. 2A-B depict an example self-capacitive touch-sensitive textile in accordance with some embodiments. FIG. 2A depicts a top view of a textile 200 and FIG. 2B depicts an example cross-sectional view taken across section 2B-2B. A simplified detail view of the conductive textile 200 is depicted in FIGS. 2A-B for clarity. In some embodiments, the textile 200 may include other elements or components (e.g., stitching, fasteners, embroidery) that is not expressly depicted in the figures. The textile 200 may also be operatively connected to one or more sensing circuits, as described in more detail below with respect to FIG. 8.

As shown in FIG. 2A, the textile 200 include a first set of conductive threads 202 that are generally oriented along a first (horizontal) direction. The textile 200 also includes a second set of conductive threads 204 that are generally oriented along a second (vertical) direction that is transverse to the first direction. In the present embodiment, the first set of conductive threads 202 and the second set of conductive threads 204 are substantially perpendicular or orthogonal to each other. However, in other embodiments, the two sets of conductive threads may be oriented at another non-orthogonal angle with respect to each other. The textile 200 also includes a set of nonconductive threads 206 that is also generally oriented along the first (horizontal) direction and another set of nonconductive threads 208 that is generally oriented along a second (vertical) direction.

In the examples depicted in FIGS. 2A-B, the first set of conductive threads 202 may be interwoven with the second set of conductive threads 204 to form a woven structure. FIGS. 2A-B depict a simple woven structure with the first set of conductive threads 202 forming the warp (or weft) threads and the second set of conductive threads 204 forming the weft (or warp) threads of the woven structure. The woven configuration depicted in FIGS. 2A-B is an illustrative example and other woven patterns may be used.

The conductive threads (202, 204) may be formed using a variety of electrically conductive materials. In some embodiments, the conductive threads are formed form an electrically conductive metallic material, including, for example, a stainless steel yarn, an iron fiber yarn, copper yarn, silver yarn, and the like. In some embodiments, the conductive threads are formed from a nonconductive material that is coated or plated with a conductive material. For example, the conductive threads may be formed from a natural or synthetic fiber that is coated with a metallic conductive material, including, for example, a silver material, nickel material, gold material, and the like. The nonconductive portion or core of the conductive thread may include synthetic materials, including a nylon material, an aramid fiber, an acrylic fiber, a polyester fiber, and so on. Natural materials include, for example, cotton, wool, flax, silk, and so on. In the present example, the conductive threads 202, 204 may include an electrically insulating coating or, alternatively may include an electrically conductive material along at least a portion of the exterior surface of the thread.

In some embodiments, the conductive threads 202, 204 are operatively connected to circuitry that is configured to drive the conductive threads with an electrical signal and also sense electrical properties of the conductive threads to determine the occurrence and/or location of a touch on the surface of the textile 200. An example sensing circuit is described in more detail below with respect to FIG. 8. In some embodiments, a drive signal is applied to both the first set of conductive threads 202 and the second set of conductive threads 204. In some implementations, the drive signal produces an electrical charge on both the first and second set of conductive threads 202, 204. The drive signal may include, an electrical pulse, series of electrical pulses, and/or an alternating current that is delivered to the conductive threads 202, 204.

As shown in FIG. 2B, a touch may be detected by the sensing circuit when the charge is dissipated or discharged by the presence of an object (e.g., the user's finger) touching or nearly touching the surface of the textile 200. In some embodiments, the object, for instance, the user's finger, is electrically conductive and connected to a ground or effective current sink. The presence of the object may capacitively couple to one or more conductive threads that are located proximate to the touch (or near touch) of the object resulting in a net change in the charge that is held on the respective threads. The change in charge may be detected by the sensing circuit and used to identify the occurrence of a touch. In some cases, the capacitive coupling between the conductive threads and the object may be referred to as a self-capacitive sensing configuration.

In some embodiments, the location of the touch may also be determined by monitoring the capacitive coupling between the object (e.g., the user's finger) and the conductive threads of the textile. For example, the sensing circuit may be configured to selectively measure or sense the electrical properties of each conductive thread of the first set of conductive threads 202. The thread or threads that are determined to be capacitively coupled to an object touching (or nearly touching) the textile 200 may be used to determine a first coordinate of the location of the touch. In the example depicted in FIG. 2A, the first set of conductive threads 202 may be used to determine a vertical or y-coordinate of the location of the touch. Similarly, by measuring or sensing the electrical properties of each conductive thread of the second set of conductive threads 204, a second coordinate may be determined. In this example, the second set of conductive threads 204 may be used to determine a horizontal or x-coordinate of the location of the touch on the textile 200.

Each of the conductive threads may be selectively measured or sensed using a time-multiplexing scheme where each of the threads are sensed at different times. Other multiplexing schemes, including, for example, wavelength multiplexing, frequency multiplexing, and the like can also be used. A modulation scheme, such as amplitude modulation, may also be used to distinguish between the measurement of the different conductive threads. Additionally or alternatively, each conductive thread may have a dedicated portion of a sensing circuit that is configured to detect changes in one or more electrical properties of the thread.

In the present example, a finger is depicted as an example object touching or nearly touching the surface of the textile 200. In other embodiments, another object, such as a stylus, probe, wand, or the like may be used to capacitively couple with the conductive threads of the textile 200. Additionally, the textile 200 may be configured to detect the occurrence of multiple touches and/or multiple types of objects on the surface of the textile 200.

As shown in FIGS. 2A-B, the first and second sets of conductive threads 202, 204 are arranged into groups of adjacent threads to form multiple conductive strip regions in the textile 200. Similarly, groups of adjacent nonconductive threads form nonconductive strip regions in the textile 200. In the present example, the conductive strip regions and nonconductive strip regions are adjacent to each other and are arranged in an alternating pattern. That is, groups of conductive threads of the first set of conductive threads 202 form conductive strip regions that are oriented along the first (horizontal) direction in an alternating fashion with groups of nonconductive threads 206 forming nonconductive strips oriented along the same direction and alternating with the conductive strips. Similarly, the second set of conductive threads 204 are arranged in to groups to form conductive strip regions that are oriented along the second (vertical) direction in an alternating fashion with groups of nonconductive threads 208 forming nonconductive strips oriented along the same direction and alternating with the conductive strips.

In some embodiments, the adjacent conductive threads that are arranged in a group are treated as a single conductor for purposes of detection the occurrence and location of a touch on the textile 400. For example, in some implementations, the collective charge is monitored on a group of conductive threads to detect capacitive coupling with an object touching or nearly touching a respective region of the textile 400. By combining the effect on multiple threads arranged in a group, the signal to noise ratio of the sensor may be improved. As a tradeoff, the location sensing resolution of the textile 200 may be reduced. However, depending on the thread density of the textile 200, the reduction in resolution may not be noticeable for most practical sensing operations.

Figure 3A:
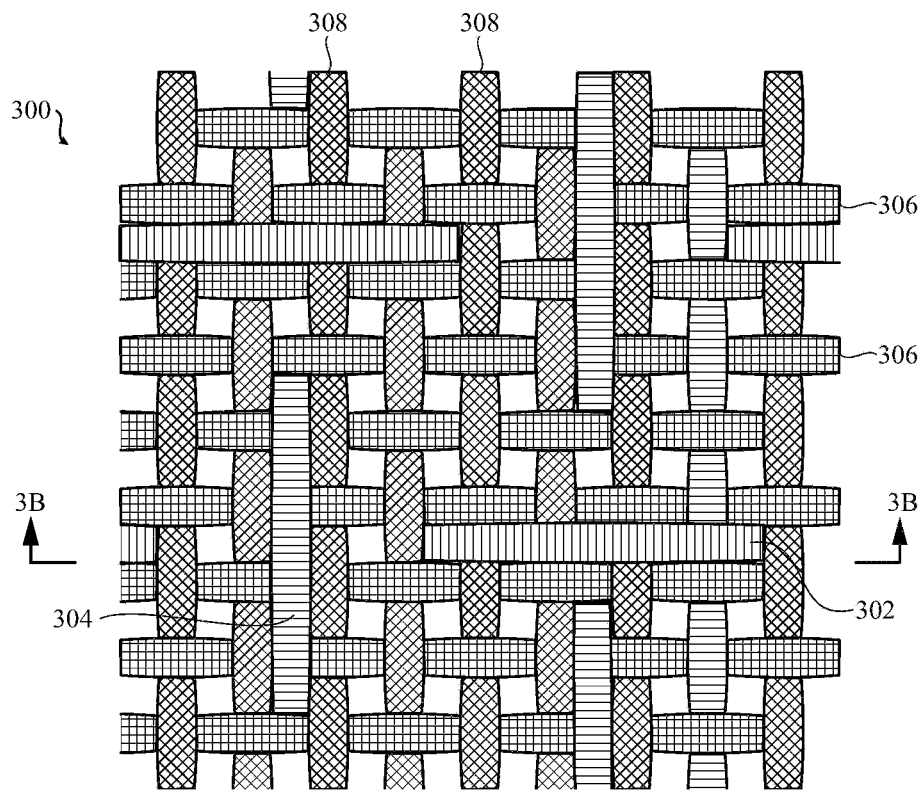
FIGS. 3A-B depict an example resistive touch-sensitive textile device in accordance with some embodiments.
Figure 3B:
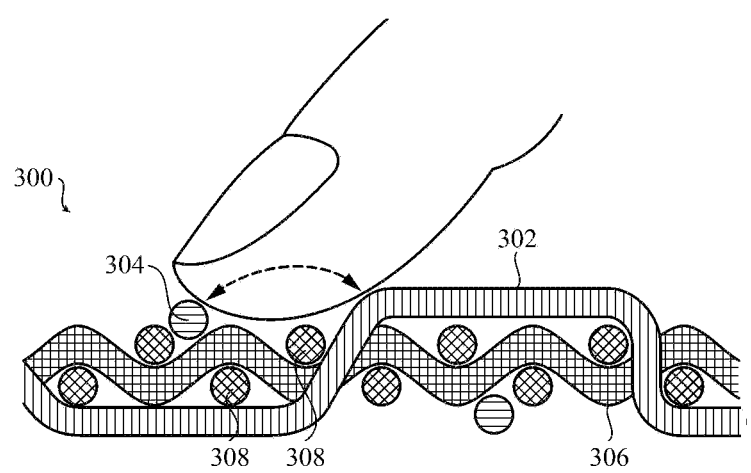

FIGS. 3A-B depict an example resistive touch-sensitive textile in accordance with some embodiments. FIG. 3A depicts a top view of a textile 300 and FIG. 2B depicts an example cross-sectional view taken across section 3B-3B. A simplified detail view of the conductive textile 300 is depicted in FIGS. 3A-B for clarity. As described with respect to the previous example, the textile 300 may include other elements or components (e.g., stitching, fasteners, embroidery) that is not expressly depicted in the figures. The textile 300 may also be operatively connected to one or more sensing circuits, as described in more detail below with respect to FIG. 8.

As shown in FIG. 3A, the textile 300 include a first set of conductive threads 302 that are generally oriented along a first (horizontal) direction. The textile 300 also includes a second set of conductive threads 304 that are generally oriented along a second (vertical) direction that is transverse to the first direction. In the present embodiment, the first set of conductive threads 302 and the second set of conductive threads 304 are substantially perpendicular or orthogonal to each other. However, in other embodiments, the two sets of conductive threads may be oriented at another non-orthogonal angle with respect to each other. The textile 300 also includes a set of nonconductive threads that is also generally oriented along the first (horizontal) direction and another set of nonconductive threads 308 that is generally oriented along a second (vertical) direction.

In the examples depicted in FIGS. 3A-B, the first set of conductive threads 302 may be interwoven with the second set of conductive threads 304 to form a woven structure. FIGS. 3A-B depict a simple woven structure with the first set of conductive threads 302 forming the warp (or weft) threads and the second set of conductive threads 304 forming the weft (or warp) threads of the woven structure. In the present embodiment, the conductive threads 302, 304 are woven over multiple threads to produce a course or elongated stitch. The elongated stich may expose a longer continuous section of a conductive thread 302, 304 that may be contacted by an object, such as a finger. This may improve or enhance the sensing capabilities of the textile 300, as discussed in more detail below. The woven configuration depicted in FIGS. 3A-B is an illustrative example and other woven patterns may be used.

The conductive threads (302, 304) may be formed using a variety of electrically conductive materials. As explained above with respect to FIGS. 2A-B, the conductive threads may be formed from an electrically conductive material or from a natural or synthetic non-conductive material that is coated or plated with a conductive material. For example, the conductive threads may be formed from a natural or synthetic fiber that is coated with a metallic conductive material, including, for example, a silver material, nickel material, gold material, and the like. In the present example, at least a portion of the exterior surface of the thread may be electrically conductive. This may facilitate electrical connection with an object touching the textile.

In some embodiments, the conductive threads 302, 304 are operatively connected to circuitry that is configured to drive the conductive threads with an electrical signal and also sense electrical properties of the conductive threads to determine the occurrence and/or location of a touch on the surface of the textile 300. An example sensing circuit is described in more detail below with respect to FIG. 8. In some embodiments, a drive signal is applied to either the first set of conductive threads 302 or the second set of conductive threads 304. In some implementations, the drive signal produces a voltage or electrical potential on one or more of the first (or second) set of conductive threads. The drive signal may include a direct current voltage, a voltage pulse, series of voltage pulses, and/or an alternating voltage that is delivered to the conductive threads 302, 304.

As shown in FIG. 3B, a touch may be detected by the sensing circuit when the resistance or impedance between two conductive threads 302, 304 is modified by the presence of an object (e.g., the user's finger) touching the two conductive threads 302, 304 of the textile 300. In some embodiments, the object, for instance, the user's finger, is electrically conductive and electrically couples the two conductive threads 302, 304. In some embodiments, the two conductive threads 302, 304 have at least a portion of the exterior surface formed from a conductive material, and thus, when the threads come into contact with an object, such as the user's finger, an electrical current or signal may pass between the threads. In some instances, a single touch on the textile 300 may result in the electrical connection of more than one pair of conductive threads. Thus, in some embodiments, a sensing circuit may be configured to detect the occurrence of a touch on the textile 300 by monitoring changes in resistance or impedance between pairs of conductive threads.

In some embodiments, the woven pattern may enhance or improve the touch sensing capabilities of the textile 300. For example, as depicted in FIGS. 3A-B, each conductive thread may be woven over multiple nonconductive threads to form an elongated stitch or continuous exposed section of thread. In some cases, this may improve the electrical contact between an object and the conductive thread resulting in a resistance or impedance measurement that is more reliable or consistent. Additionally, as shown in FIGS. 3A-B, the conductive threads 302, 304 are separated by multiple nonconductive threads 306, 308, which may reduce incidental electrical coupling between the conductive threads 302, 304, which may also improve the consistency and/or reliability of the sensing properties of the textile 300.

In some embodiments, the location of the touch may also be determined by monitoring the resistance or impedance between one or more pairs of conductive threads of the textile 300. For example, the sensing circuit may be configured to selectively measure or sense the electrical properties between each conductive thread of the first set of conductive threads 302 and one or more conductive thread of the second set of conductive threads 304. Thread pairs that are electrically coupled (due to the touch of an object) may be used to determine the coordinates of the location of the touch. In the example depicted in FIG. 3B, a conductive thread 302 of the first set of conductive threads is electrically coupled to a conductive thread 304 of the second set of conductive threads by the touching object (e.g., the user's finger). If the location of the first 302 and second 304 electrical threads that are electrically connected is known, then the location of the touch can be estimated. As mentioned previously, more than one pair of conductive threads may be connected by a single touch. In some cases, the location of the touch is estimated based on a centroid or an approximated center of the multiple pairs of threads that are electrically connected.

Similar to as discussed in the example above, the electrical properties (including the resistance or impedance) of each pair of conductive threads may be selectively measured or sensed using a time-multiplexing scheme where the resistance or impedance between each pair of threads is sensed at different times. If a time varying voltage signal is use to drive the treads, other multiplexing schemes, including, for example, wavelength multiplexing, frequency multiplexing, and the like can also be used. A modulation scheme, such as amplitude modulation, may also be used to distinguish between the measurement of the different conductive threads. Additionally or alternatively, each conductive thread may have a dedicated portion of a sensing circuit that is configured to detect changes in one or more electrical properties of the thread.

In the present example, a finger is depicted as an example object touching or nearly touching the surface of the textile 300. However, as previously discussed, another object, such as a conductive stylus, probe, wand, or the like may be used to electrically couple or connect pairs of conductive threads of the textile 300. Additionally, the textile 300 may be configured to detect the occurrence of multiple touches and/or multiple types of objects on the surface of the textile 300.

Figure 4A:
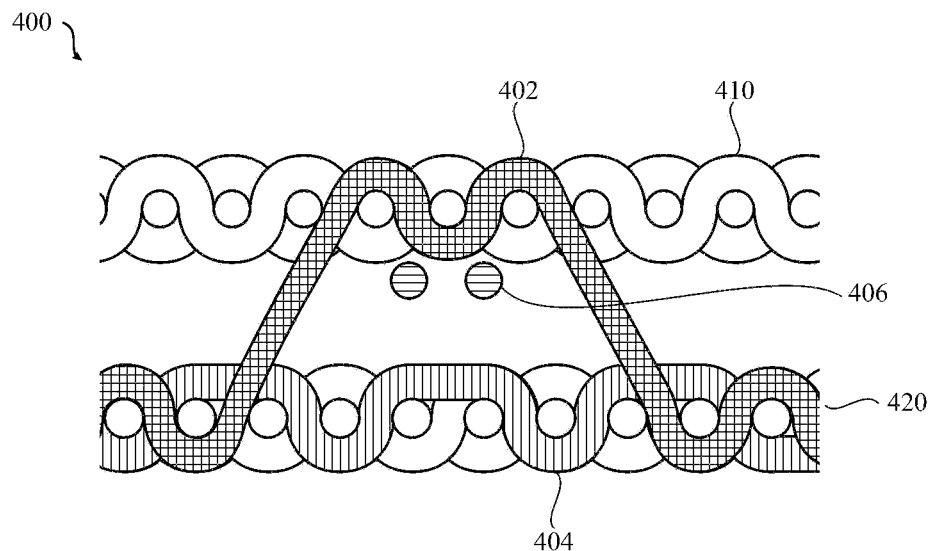
FIGS. 4A-B depict an example two-layer resistive touch-sensitive textile device in accordance with some embodiments.
Figure 4B:
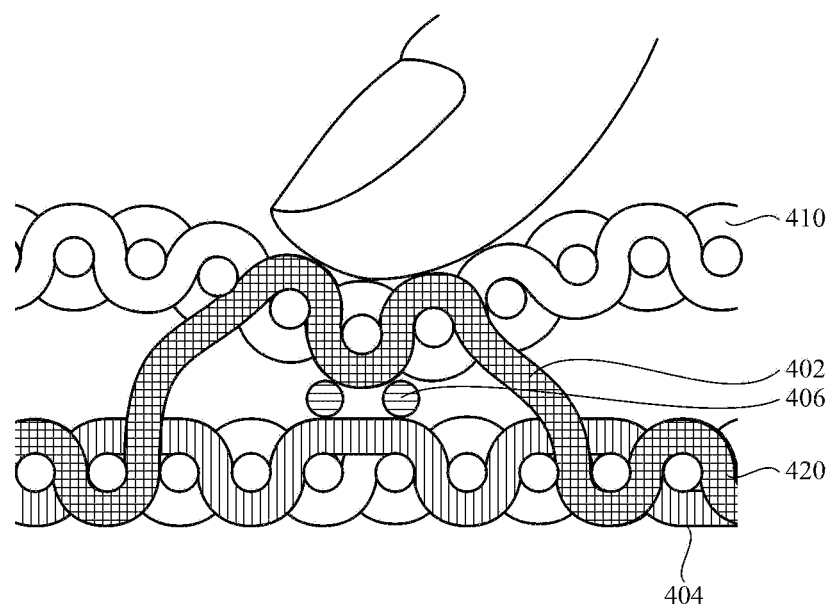

FIGS. 4A-B depict an example two-layer resistive touch-sensitive textile in accordance with some embodiments. As shown in FIGS. 4A-B, a textile 400 is formed from two textile layers: an upper textile layer 410 and a lower textile layer 420. In this example, a spacer structure, including a monofilament yarn 402 maintains a gap between the two textile layers. In the present example, the monofilament yarn 402 is interwoven with both the upper textile layer 410 and the lower textile layer 420. As shown in FIG. 4B, the monofilament yarn 402 (example spacer structure) is configured to deflect and compress in response to a touch on the upper textile layer 410. The monofilament yarn 402 may also deflect or compress in response to a touch on the lower textile layer 420 (not shown).

As shown in FIG. 4A, a first set of conductive threads 406 may be oriented along a first direction and may be incorporated with the first textile layer 410. In some embodiments, the first set of conductive threads 406 is interwoven with other threads of the upper textile layer 410. In some embodiments, the first set of conductive threads 406 is attached to a surface of the upper textile layer 410. In some embodiments, the first set of conductive threads 406 is disposed within the gap in a location that is biased away from the lower textile layer 420.

As shown in FIG. 4A, a second set of conductive threads 404 may be oriented along a second direction that is transverse to the first direction of the first set of conductive threads 406. The second set of conductive threads 404 may be interwoven with other threads of fibers of the lower textile layer 420. In some embodiment, the second set of conductive threads 404 are attached to a surface of the lower textile layer 420. In some embodiments, the second set of conductive threads 404 is disposed within the gap in a location that is biased away from the upper textile layer 410.

The conductive threads (406, 404) may be formed using a variety of electrically conductive materials. As explained above with respect to FIGS. 2A-B, the conductive threads may be formed from an electrically conductive material or from a natural or synthetic non-conductive material that is coated or plated with a conductive material. For example, the conductive threads may be formed from a natural or synthetic fiber that is coated with a metallic conductive material, including, for example, a silver material, nickel material, gold material, and the like. In the present example, at least a portion of the exterior surface of the thread may be electrically conductive. This may facilitate electrical connection between conductive threads when the textile is compressed by the touch of an object.

In some embodiments, the first and second sets of conductive threads 406, 404 are operatively connected to circuitry that is configured to drive the conductive threads with an electrical signal and also sense electrical properties of the conductive threads to determine the occurrence and/or location of a touch on the surface of the textile 400. An example sensing circuit is described in more detail below with respect to FIG. 8. In some embodiments, a drive signal is applied to either the first set of conductive threads 406 or the second set of conductive threads 404. In some implementations, the drive signal produces a voltage or electrical potential on one or more of the first (or second) set of conductive threads. The drive signal may include a direct current voltage, a voltage pulse, series of voltage pulses, and/or an alternating voltage that is delivered to the conductive threads 406, 404.

As shown in FIG. 4B, a touch on one (or both) of the textile layers 410, 420 may cause the monofilament yarn 402 to collapse bringing the first and second conductive threads 406, 404 in contact with each other. In some embodiments, a touch may be detected by the sensing circuit when the resistance or impedance between two conductive threads 406, 404 is modified due to contact between the two conductive threads 406, 404. In some embodiments, the two conductive threads 406, 404 have at least a portion of the exterior surface formed from a conductive material, and thus, when the threads come into contact with each other, an electrical current or signal may pass between the threads. In some instances, a single touch on the textile 400 may result in the electrical connection of more than one pair of conductive threads. Thus, in some embodiments, a sensing circuit may be configured to detect the occurrence of a touch on the textile 400 by monitoring changes in resistance or impedance between pairs of conductive threads.

In some embodiments, the location of the touch may also be determined by monitoring the resistance or impedance between one or more pairs of conductive threads of the textile 400. For example, the sensing circuit may be configured to selectively measure or sense the electrical properties between each conductive thread of the first set of conductive threads 406 and one or more conductive thread of the second set of conductive threads 404. Thread pairs that are electrically coupled (due to the touch of an object) may be used to determine the coordinates of the location of the touch. In the example depicted in FIG. 4B, a conductive thread 406 of the first set of conductive threads is electrically coupled to a conductive thread 404 of the second set of conductive threads. If the location of the first 406 and second 404 electrical threads within the textile is known, then the location of the touch can be estimated. As mentioned previously, more than one pair of conductive threads may be connected by a single touch. In some cases, the location of the touch is estimated based on a centroid or an approximated center of the multiple pairs of threads that are electrically connected.

Similar to as discussed in the example above, the electrical properties (including the resistance or impedance) of each pair of conductive threads may be selectively measured or sensed using a time-multiplexing scheme where the resistance or impedance between each pair of threads is sensed at different times. If a time varying voltage signal is use to drive the treads, other multiplexing schemes, including, for example, wavelength multiplexing, frequency multiplexing, and the like can also be used. A modulation scheme, such as amplitude modulation, may also be used to distinguish between the measurement of the different conductive threads. Additionally or alternatively, each conductive thread may have a dedicated portion of a sensing circuit that is configured to detect changes in one or more electrical properties of the thread.

In the present example, a finger is depicted as an example object touching or nearly touching the surface of the textile 400. However, any other object, such as a stylus, probe, wand, or the like may be used to deflect the upper (or lower) textile layer to register a touch using the textile 400.

Figure 5A:
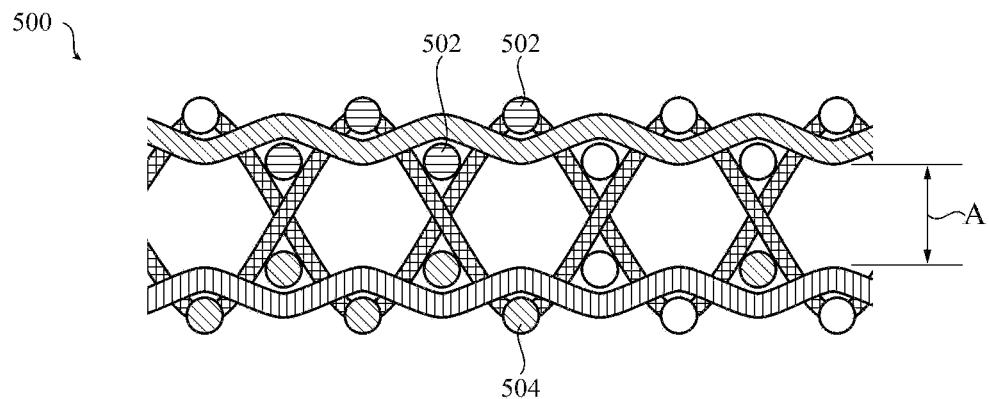
FIGS. 5A-B depict an example two-layer capacitive touch-sensitive textile device in accordance with some embodiments.
Figure 5B:
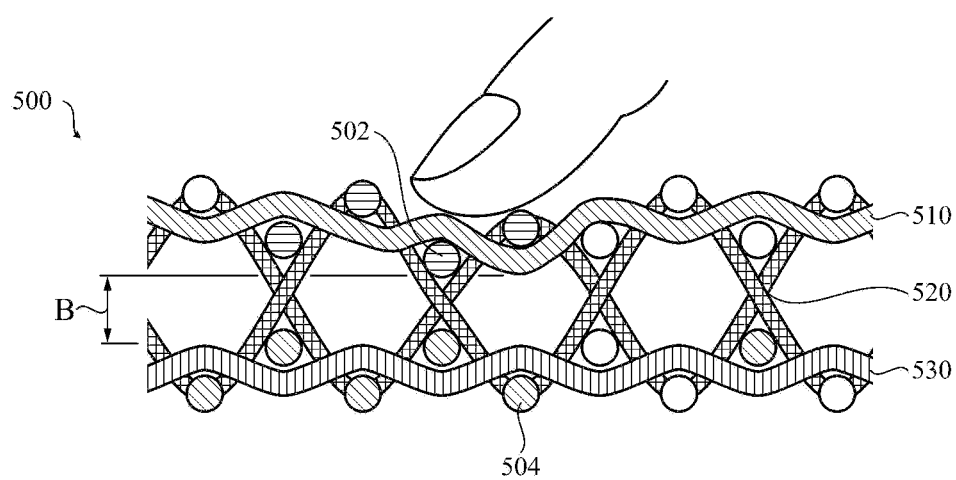

FIGS. 5A-B depict an example two-layer capacitive touch-sensitive textile in accordance with some embodiments. As shown in FIGS. 5A-B, a textile 500 is formed from two textile layers: an upper textile layer 510 and a lower textile layer 530. In this example, a spacer structure, including a monofilament yarn 520 maintains a gap between the two textile layers. In the present example, the monofilament yarn 520 is interwoven with both the upper textile layer 510 and the lower textile layer 530. As shown in FIG. 5B, the monofilament yarn 520 (example spacer structure) is configured to deflect and/or compress in response to a touch on the upper textile layer 510. The monofilament yarn 520 may also deflect or compress in response to a touch on the lower textile layer 530 (not shown).

As shown in FIG. 5A, a first set of conductive threads 502 may be oriented along a first direction and may be incorporated with the first textile layer 510. In some embodiments, the first set of conductive threads 502 is interwoven with other threads of the upper textile layer 510. In some embodiments, the first set of conductive threads 502 is attached to a surface of the upper textile layer 510. In some embodiments, the first set of conductive threads 502 is disposed within the gap in a location that is biased away from the lower textile layer 530.

As shown in FIG. 5A, a second set of conductive threads 504 may be oriented along a second direction that is transverse to the first direction of the first set of conductive threads 502. The second set of conductive threads 504 may be interwoven with other threads of fibers of the lower textile layer 530. In some embodiment, the second set of conductive threads 504 are attached to a surface of the lower textile layer 530. In some embodiments, the second set of conductive threads 504 is disposed within the gap in a location that is biased away from the upper textile layer 510.

The conductive threads (302, 304) may be formed using a variety of electrically conductive materials. As explained above with respect to FIGS. 2A-B, the conductive threads may be formed from an electrically conductive material or from a natural or synthetic non-conductive material that is coated or plated with a conductive material. For example, the conductive threads may be formed from a natural or synthetic fiber that is coated with a metallic conductive material, including, for example, a silver material, nickel material, gold material, and the like. In the present example, the conductive threads 202, 204 may include an electrically insulating coating or, alternatively may include an electrically conductive material along at least a portion of the exterior surface of the thread.

In some embodiments, the first and second sets of conductive threads 502, 504 are operatively connected to circuitry that is configured to drive the conductive threads with an electrical signal and also sense electrical properties of the conductive threads to determine the magnitude and/or location of a force on the surface of the textile 500. An example sensing circuit is described in more detail below with respect to FIG. 8. In some embodiments, a drive signal is applied to the first set of conductive threads 502 and/or the second set of conductive threads 504. In some implementations, the drive signal produces an electrical charge on one or more of the first (or second) set of conductive threads. The drive signal may include an electrical pulse, series of electrical pulses, and/or an alternating current/voltage that is delivered to the conductive threads 502, 504.

As shown in FIG. 5B, the force of a touch on one (or both) of the textile layers 510, 530 may cause the monofilament yarn 520 to collapse. As a result of the touch, the distance between the upper textile layer 510 and the lower textile layer 530 is reduced from distance "A" as shown in FIG. 5A to distance "B" shown in FIG. 5B. The change in the distance between the upper textile layer 510 and the lower textile layer 530 may be detected by a sensing circuit that is configure to monitor the capacitance between one or more threads of the first set of conductive threads 502 (associated with the upper textile layer 510) and one or more threads of the second set of conductive threads 504 (associated with the lower textile layer 530).

In some embodiments, the distance that the monofilament yarn 520 (example spacer structure) is compressed corresponds to the force of the touch. Thus, by determining the relative deflection of the two textile layers 510, 530 using, for example, a capacitive measurement, the force of the touch can be estimated. In some embodiments, the monofilament yarn 520 (example spacer structure) has an approximately linear response for at least some degree of compression. Thus, in some cases, a deflection that is measured by a capacitive change between one or more conductive threads 502, 504 may be directly proportional to the force of the touch on the textile 500. In some embodiments, the monofilament yarn 520 (example spacer structure) has a known, non-linear response to a compressive force. The non-linear response may be approximated by a function that may be obtained from empirical data. Thus, in some cases, a capacitive change between one or more conductive threads 502, 504 may be related to the force of the touch on the textile 500 by the non-linear function.

In some embodiments, the touch on the upper textile layer 510 may also alter or affect the capacitive coupling between one or more conductive threads 502, 504. In some cases, the presence of an object, such as the user's finger, on or near the textile 500 will result in a change in the capacitance between the conductive threads 502, 504 due to capacitive properties of the object. In some cases, the capacitive coupling between the conductive threads 502, 504 and the object touching (or nearly touching) the textile 500 can be used to determine the occurrence of a touch (or near touch), even if the two textile layers 510, 530 are not deflected or compressed, as described above. In some cases, the effects of capacitive coupling with the object are estimated or compensated for when computing the force measurement using the deflection or compression between the textile layers. In some embodiments, one or both of the textile layers includes a shield or shielding layer that reduces the capacitive coupling between the conductive threads and the object touching the textile 500.

In some embodiments, the location of the touch may also be determined by monitoring the capacitance between one or more pairs of conductive threads of the textile 500. For example, the sensing circuit may be configured to selectively measure or sense the electrical properties between each conductive thread of the first set of conductive threads 502 and one or more conductive thread of the second set of conductive threads 504. Thread pairs having a change in capacitive coupling (due to the touch of an object) may be used to determine the coordinates of the location of the touch. In the example depicted in FIG. 5B, a conductive thread 502 of the first set of conductive threads may be capacitively coupled to a conductive thread 504 of the second set of conductive threads, which may change as a result of a touch or a force applied to the textile 500. If the location of the first 502 and second 504 electrical threads within the textile is known, then the location of the touch can be estimated. In some cases, more than one pair of conductive threads may affected a single touch. Thus, in some cases, the location of the touch is estimated based on a centroid or an approximated center of the multiple pairs of threads having a modified capacitance due to a touch or force.

Similar to as discussed in the example above, the electrical properties (including the capacitance) of each pair of conductive threads may be selectively measured or sensed using a time-multiplexing scheme where the capacitance between each pair of threads is sensed at different times. Other multiplexing schemes, including, for example, wavelength multiplexing, frequency multiplexing, and the like can also be used. A modulation scheme, such as amplitude modulation, may also be used to distinguish between the measurement of the different conductive threads. Additionally or alternatively, each conductive thread may have a dedicated portion of a sensing circuit that is configured to detect changes in one or more electrical properties of the thread.

In the present example, a finger is depicted as an example object touching or nearly touching the surface of the textile 500. However, any other object, such as a stylus, probe, wand, or the like may be used to deflect the upper (or lower) textile layer to register a touch using the textile 500.

For each of the embodiments described above with respect to FIGS. 2A-B through 5A-B, the conductive threads may be used to detect the touch or force of a touch on the textile. Additionally, the conductive threads may be used a conduit or conductor for transmitting electrical signals to and away from the touch-sensitive portion of the textile. In some cases, the textile may be configured to reduce noise or cross-talk between the conductive threads that are being used as conduits for the electrical signals.

Figure 6A:
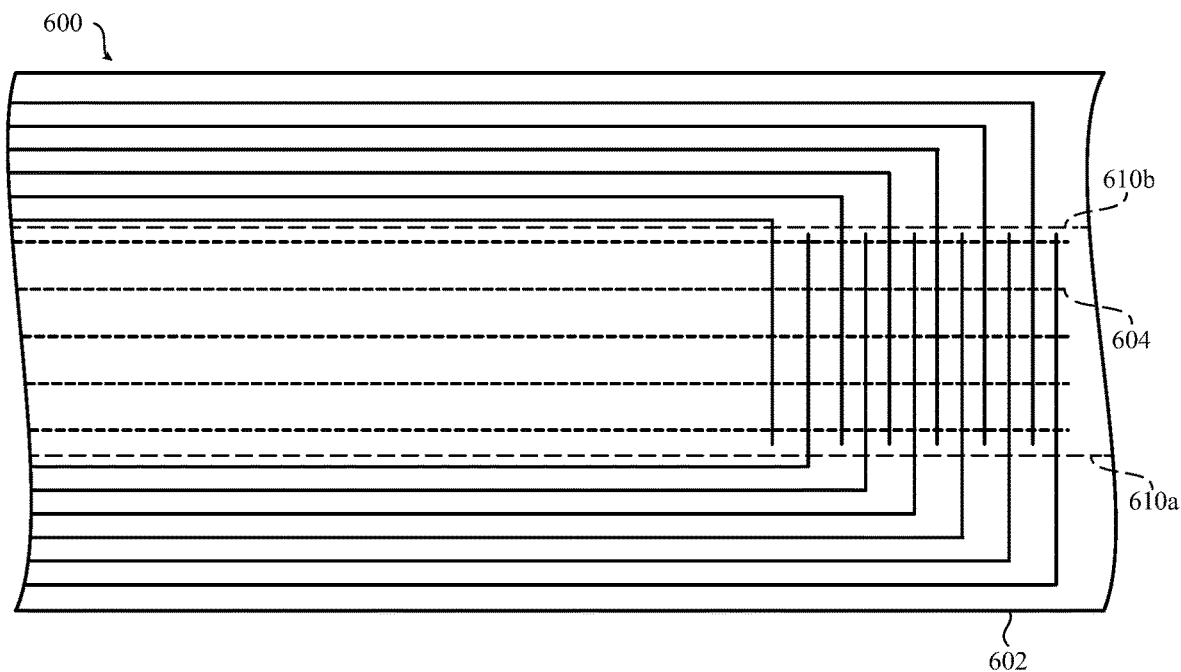
FIGS. 6A-B depict an example conductive thread configuration for a touch-sensitive textile device in accordance with some embodiments.
Figure 6B:
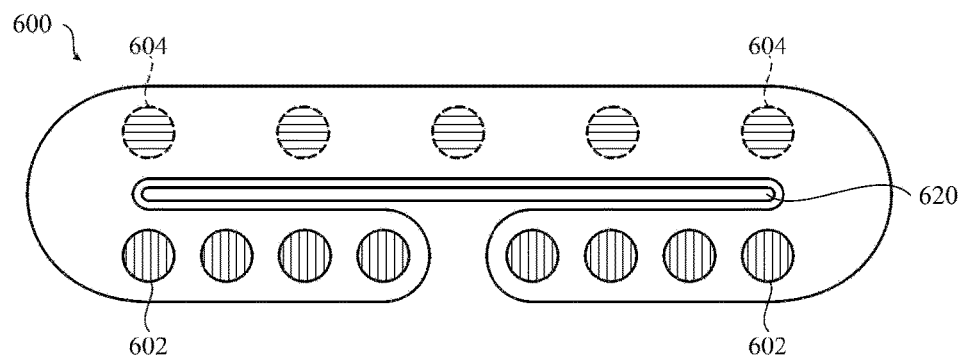

FIGS. 6A-B depict an example conductive thread configuration for a touch-sensitive textile device in accordance with some embodiments. FIG. 6A depicts a flat pattern of a textile 600 and FIG. 6B depicts a folded or bent version of the textile 600. In the present example, the textile 600 may form part of a wristband or strap having a touch sensitive region connected to other circuitry or components by conductive threads. The embodiment depicted in FIGS. 6A-B may be used to minimize or reduce cross talk or noise caused by having two sets of conducive threads integrated into the textile. As described below, a first set of conductive threads 602 may be electrically isolated from a second set of conductive threads 604 by folding the first set of conductive threads 602 under a portion of the textile 600.

FIG. 6B depicts an example flat pattern of a textile 600 having two sets of conductive threads 602, 604 used to form a touch-sensitive region toward the right-hand end of the textile 600. The touch-sensitive region may correspond to one or more of the touch-sensitive textile embodiments described above with respect to FIG. 2A-B through 5A-B. In this example, the conductive threads 603, 604 are also used to carry electrical signals to and from the touch-sensitive region. As shown in FIG. 6A, the second set of conductive threads 604 are disposed in a middle portion of the textile 600. The first set of conductive threads 602 are disposed in edge portions of the flattened textile 600.

As indicated in FIG. 6A, the flat textile 600 may be bent along bend lines 610a and 610b for form the folded version depicted in FIG. 6B. As shown in FIG. 6B, the first set of conductive lines 602 are folded under a portion of the textile 600, which may reduce the profile or size of the textile 600 without significantly increasing the cross talk or interference between the first and second sets of conductive threads 602, 604. In some embodiments, a shield component 620 is disposed between the middle portion of the textile 600 and the edge portions that are folded under the middle portion. The shield component 620 may increase the electrical isolation between the first and second sets of conductive threads 602, 604 and further reduce the cross talk and/or electrical interference between the two.

In the embodiment depicted in FIGS. 6A-B, the first and second conductive threads 602, 604 may be formed from continuous conductive threads that are interwoven into the material of the textile 600. As shown in FIG. 6A, the continuous conductive threads of the first set of conductive threads 602 may be woven to produce an approximately 90 degree bend near the right-hand end of the textile 600. In some cases, the bend in the first set of conductive threads 602 is formed into the weave of the textile 600.

FIGS. 6A-B depict one example embodiment. However, in alternative embodiments, the textile may be formed in a variety of different ways. For example, the first set of conductive lines may be folded under the second set of conductive lines on a single flap of material. By way of further example, a portion of the first set of conductive lines may be folded over the second set of conductive lines and another portion of the first set of conductive lines may be folded under the second set of conductive lines. A shield layer or component may be disposed between each flap of the textile that is folded over and under the second set of conductive lines.

Figure 7:
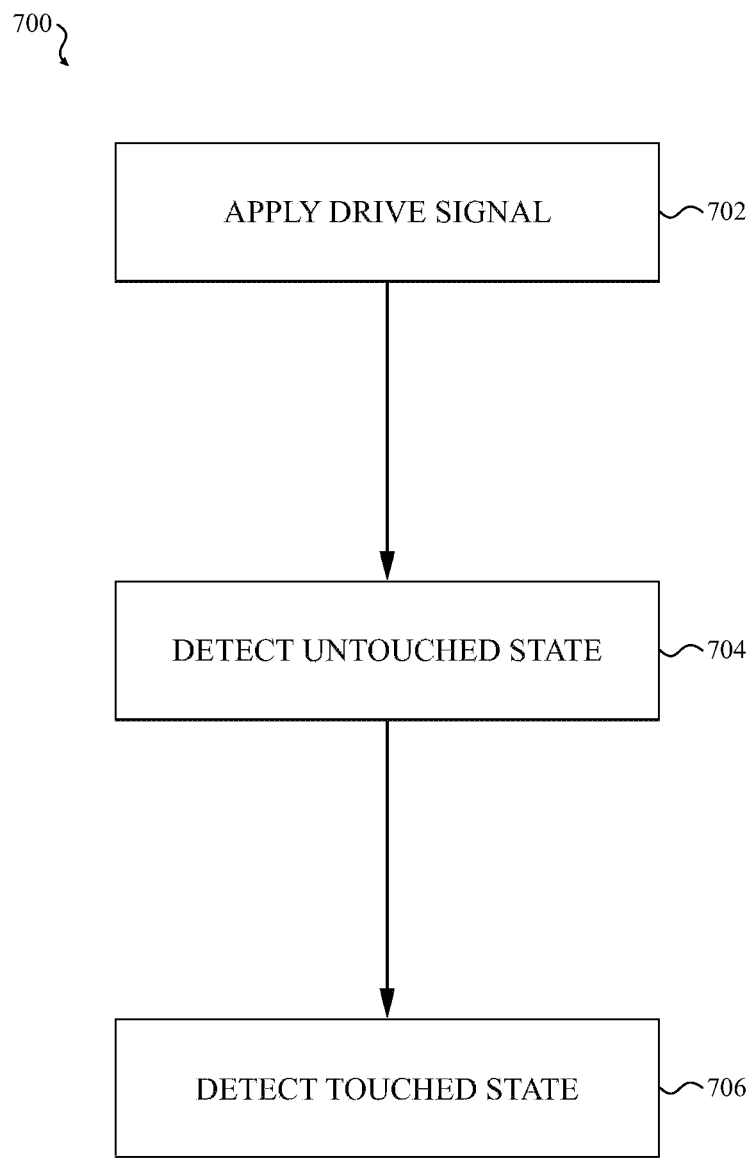
FIG. 7 depicts an example process for operating a touch-sensitive textile device in accordance with some embodiments.

FIG. 7 depicts an example process 700 for operating a touch-sensitive textile device in accordance with some embodiments. Example process 700 may be used to operate one or more of the example touch-sensitive textiles described above with respect to FIGS. 2A-B through 5A-B. While the particular sensing principle and the electrical measurements may vary depending on the touch-sensitive textile, the operations of process 700 outlined below may apply universally.

In operation 702, a drive signal is applied to the touch-sensitive textile. As described above with respect to the embodiments of FIGS. 2A-B through 5A-B above, a touch-sensitive textile may include one or more sets of conductive threads that are operatively connected to circuitry. In some embodiments, the circuitry is configured to drive the conductive threads with an electrical signal. The response to the signal may be used to sense the occurrence, location, and or force of a touch on the textile. An example sensing circuit is described in more detail below with respect to FIG. 8. With respect to operation 702, the drive signal may include a direct current signal or portion of a signal that is applied to one or more of the conductive threads of the textile. In some embodiments, the drive signal includes an electrical pulse, series of pulses, and/or alternating electrical signal that is applied to one or more of the conductive threads of the textile. In particular, the case of a resistive-based touch-sensitive textile, the drive signal may include a characteristic voltage or electrical potential. Examples of resistive-based touch-sensitive textiles are provided above with respect to FIGS. 3A-B and 4A-B. In the case of a capacitive-based touch-sensitive textile, the drive signal may include an electrical signal that has a time varying current and/or voltage component. Examples of capacitive-based touch-sensitive textiles are provided above with respect to FIGS. 2A-B and 5A-B.

In operation 704, an untouched state is detected. In particular, an electrical measurement or series of electrical measurements may be taken while a touch-sensitive textile is not being touched. Sensor measurements performed during the untouched state may represent the quiescent or steady-state condition of the touch-sensitive textile. In some cases, the untouched state is detected by taking a series of measurements over a period of time to determine or confirm that the touch-sensitive textile is not being touched in accordance with a user input. In some cases, particularly if the textile is incorporated into a wearable garment, there may be some degree of incidental user contact due to the fact that the textile is located near or on the user's body. For purposes of operation 704, incidental touches are not considered a touch input.

In some embodiments, operation 704 is performed at a regularly repeating interval. In some cases, if an untouched state is detected, no action is taken. In some cases, if an untouched state is detected, the sensor measurements are recorded or used to compute a baseline condition or conditions. In some instances, the sensor measurements taken during the untouched state may be used to compensate the sensor for effects due to changing temperature or other environmental conditions.

In operation 706, a touched state is detected. In some embodiments, the touched state is detected due to a variation or deviation in the sensor measurements as compared to a baseline measurement or the measurements obtained with respect to operation 704, discussed above. The particulars of the touch sensing may depend on the type of touch-sensitive textile that is used. For example, if the touch-sensitive textile is a resistive-based sensing configuration similar to the embodiments described above with respect to FIGS. 3A-B and 4A-B, a change in the electrical resistance or impedance between one or more pairs of conductive threads may indicate a touched state. Similarly, if the touch-sensitive textile is a capacitive-based sensing configuration similar to the embodiments described above with respect to FIGS. 2A-B and 5A-B, a change in the capacitance between one or more pairs of conductive threads may indicate a touched state.

In response to detecting a touched state, a touch input may be interpreted, relayed, and/or stored for use by another aspect of the system. For example, in accordance with detecting a touched state, the location of the touch may be determined and relayed to another aspect of the system. In some embodiments, the touch input provided to the touch-sensitive textile may be used to control a cursor or other element of a graphical user interface. In some implementation, the movement of the touch (if any) may be determined and used to interpret a gesture performed by the user. The gesture may be relayed and/or a command associated with the gesture may be relayed to another aspect of the system that may take further action based on the touch input.

Figure 8:
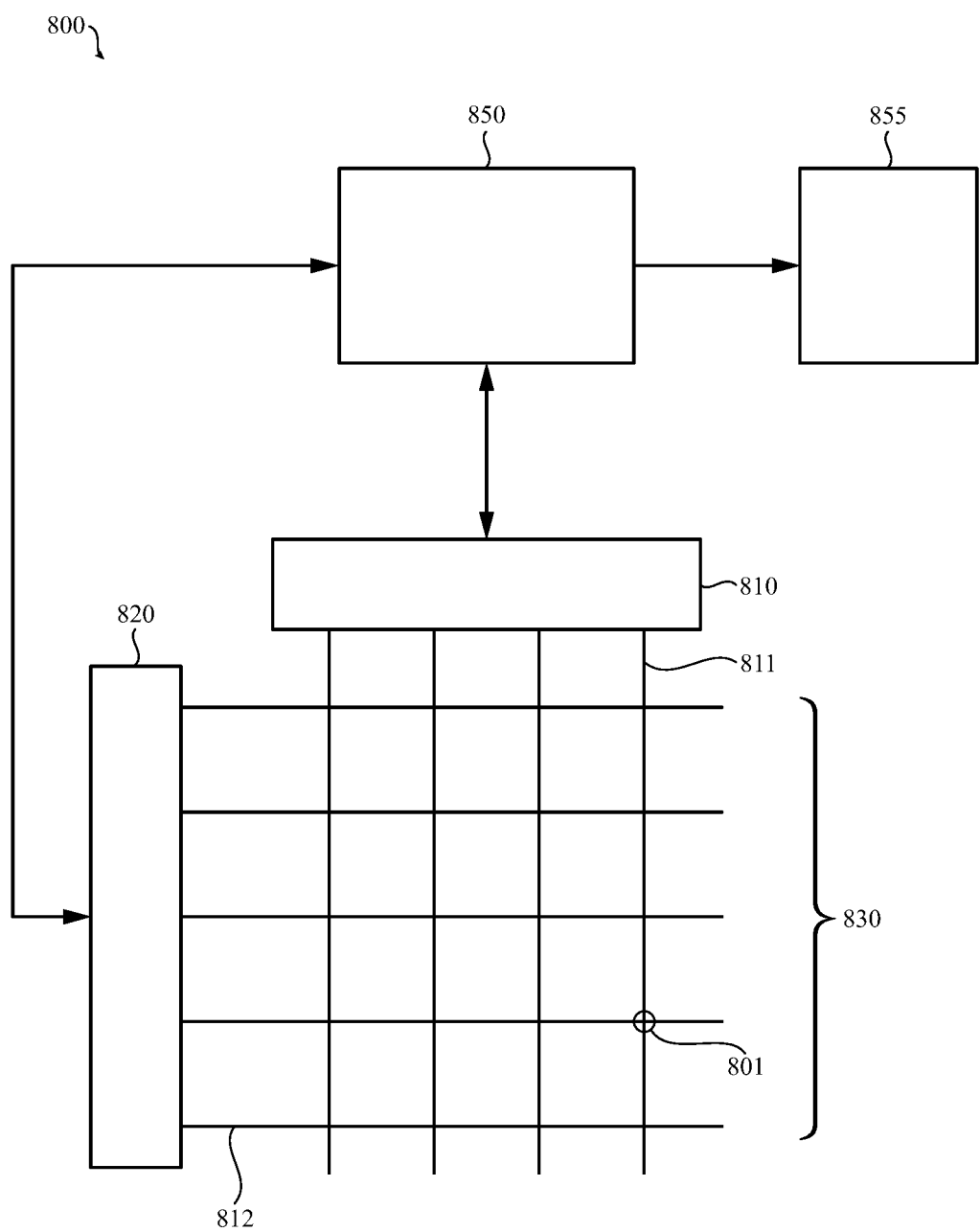
FIG. 8 depicts an example schematic diagram of a touch-sensitive textile system in accordance with some embodiments.

FIG. 8 depicts an example schematic diagram of a touch-sensitive textile system 800 in accordance with some embodiments. In general, FIG. 8 depicts a simplified version of a sensing system 800 that may be used to operate one or more of the touch-sensitive textiles described above with respect to FIGS. 2A-B through 5A-B.

As shown in FIG. 8, a touch-sensitive textile 830 may include two sets of conductive threads. In this example, a first set of conductive threads 811 is oriented along a first (vertical) direction and a second set of conductive threads 812 is oriented along a second (horizontal) direction. The intersection of a pair of conductive threads may operate as a sensing node 801. For example, in embodiments where a touch is detected by measuring a resistance between pairs of conductive threads, the intersection (or near intersection) of the threads may function as a sensing node 801. Similarly, in embodiments where a touch is detected by measuring a change in capacitance between pairs of conductive threads or capacitive coupling of one or more conductive threads, the intersection of the threads may also function as a sensing node 801. When an object touches a sensing node 801, both the occurrence of the touch and the location of the touch may be determined.

As shown in FIG. 8, the first set of conductive threads 811 may be operatively coupled to a column selector 810 that is configured to selectively couple one or more of the conductive threads 811 with the sensing circuit 850. Similarly, the second set of conductive threads 812 may be operatively coupled to a row selector 820 that is configured to selectively couple one or more of the conductive threads 812 with the sensing circuit 850. In some embodiments, the column selector 810 and the row selector 820 may include a bank of switches that are configured to couple the conductive threads with the sensing circuit in accordance with a time-multiplexed sequence. Additionally or alternatively, the column selector 810 and the row selector 820 may include a wavelength or frequency division multiplexing unit that is used multiplex the signals from the conductive threads.

As shown in FIG. 8, the system 800 also includes a sensing circuit 850 that is operatively coupled to the conductive threads via the column selector 810 and the row selector 820. The sensing circuit 850 includes one or more subsystems for generating a drive signal in accordance with the embodiments described above. In some embodiments, the sensing circuit 850 includes a voltage source for generating a direct current voltage signal. In some embodiments, the sensing circuit includes a voltage and/or current source for generating an electrical pulse, a series of electrical pulses, and/or an alternating electrical current/voltage to drive the conductive threads 811, 812 of the textile 830.

The sensing circuit 850 may also include one or more subsystems for detecting a change in one or more aspects of the electrical response of the touch-sensitive textile 830. As previously described, in some embodiments, the sensing circuit 850 may be configured to detect a change in resistance and/or impedance between one or more pairs of conductive threads. A change in resistance may be measured using a circuit that is configured to measure an electrical potential with respect to ground or another reference potential. Also, as previously described, in some embodiments, the sensing circuit 850 may be configured to detect a change in capacitance or change in capacitive coupling between pairs of conductive threads. A change in capacitance or capacitive coupling may be performed using, for example, a current integrator, charge amplifier, or other similar type of circuit. In some cases, the sensing circuit 850 is formed using one or more application specific integrated circuit (ASIC) components.

As shown in FIG. 8, the sensing circuit 850 may be operatively coupled to an input/output circuit 855 that is configured to communicate signals between the system 800 and other components of the device or other devices. In some implementations, the input/output circuit is configured to transmit a command or touch input information to other components of the device or to other devices to perform an action in response to a touch on the touch-sensitive textile 830. In some embodiments, the input/output circuit incudes a wireless communication circuit that is configured to transmit signals using a wireless communication interface. Generally, the wireless communication interface may include, without limitation, radio frequency, optical, acoustic, and/or magnetic signals and may be configured to operate over a wireless interface or protocol. Example wireless interfaces include, radio frequency cellular interfaces, fiber optic interfaces, acoustic interfaces, Bluetooth interfaces, infrared interfaces, USB interfaces, Wi-Fi interfaces, TCP/IP interfaces, network communications interfaces, or any conventional communication interfaces.

In accordance with an embodiment, a touch-sensitive textile device is provided that includes a first set of conductive threads oriented along a first direction, a second set of conductive threads interwoven with the first set of conductive threads and oriented along a second direction, and a sensing circuit operatively coupled to the first and second set of conductive threads, the sensing circuit is configured to apply a drive signal to the first and second set of conductive threads, and detect a variation in capacitive coupling on one of the first and second set of conductive threads in response to an object touching or nearly touching the touch-sensitive textile device.

In accordance with another embodiment, sensing circuit is configured to detect a touch or near touch on the touch-sensitive textile based on the variation in charge.

In accordance with another embodiment, the sensing circuit is further configured to determine a location of the touch based on the variation in charge.

In accordance with another embodiment, the touch-sensitive textile device includes a woven textile component including the first and second set of conductive threads, and a set of nonconductive threads interwoven with the first and second set of conductive threads.

In accordance with another embodiment, the touch-sensitive textile device includes a group nonconductive threads oriented along the first direction forming a nonconductive strip region, and the first set of conductive threads includes a group conductive threads forming a conductive strip region that is adjacent to the nonconductive strip region.

In accordance with another embodiment, the touch-sensitive textile device includes nonconductive strip regions formed from nonconductive threads, and conductive strip regions formed from the first and second sets of conductive threads, nonconductive strip regions and conductive strip regions are arranged in an alternating pattern in both the first and second directions.

In accordance with an embodiment, a touch-sensitive textile device is provided that includes a first set of conductive threads oriented along a first direction, a second set of conductive threads interwoven with the first set of conductive threads and oriented along a second direction, and a sensing circuit operatively coupled to the first and second set of conductive threads, the sensing circuit is configured to apply a drive signal to the first set of conductive threads, and detect a variation in resistance between any one of the first set of conductive threads and any one of the second set of conductive threads.

In accordance with another embodiment, sensing circuit is configured to sense a touch on the first or second set of conductive threads based on the variation in resistance.

In accordance with another embodiment, the sensing circuit is further configured to determine a location of the touch based on the variation in resistance.

In accordance with another embodiment, the touch-sensitive textile device includes a woven textile component including the first and second set of conductive threads, and a set of nonconductive threads interwoven with the first and second set of conductive threads.

In accordance with an embodiment, a touch-sensitive textile device is provided that includes a first set of conductive threads disposed in a first textile layer, a second set of conductive threads disposed in a second textile layer, a spacer structure separating the first and second textile layers, the spacer structure configured to deflect in response to a touch on the first or second textile layer, and a sensing circuit operatively coupled to the first and second set of conductive threads, the sensing circuit is configured to apply a drive signal to the first set of conductive threads, and detect a variation in resistance between any one of the first set of conductive threads and any one of the second set of conductive threads.

In accordance with another embodiment, sensing circuit is configured to sense a touch on the first or second textile layers based on the variation in resistance.

In accordance with another embodiment, the sensing circuit is further configured to determine a location of the touch based on the variation in resistance.

In accordance with another embodiment, the first textile layer is formed from a first set of nonconductive threads interwoven with the first set of conductive threads, and the second textile layer is formed from a second set of nonconductive threads interwoven with the second set of conductive threads.

In accordance with another embodiment, the spacer structure is a monofilament yarn interwoven between the first and second textile layers.

In accordance with an embodiment, a touch-sensitive textile device is provided that includes a first set of conductive threads disposed in a first textile layer, a second set of conductive threads disposed in a second textile layer, a spacer structure separating the first and second textile layers, the spacer structure configured to deflect in response to a touch on the first or second textile layer, and a sensing circuit operatively coupled to the first and second set of conductive threads, the sensing circuit is configured to apply a drive signal to the first set of conductive threads, and detect a variation in capacitance between any one of the first set of conductive threads and any one of the second set of conductive threads due to a deflection in the spacer structure.

In accordance with another embodiment, sensing circuit is configured to sense a touch on the first or second textile layers based on the variation in capacitance.

In accordance with another embodiment, the sensing circuit is further configured to determine a location of the touch based on the variation in capacitance.

In accordance with another embodiment, the first textile layer is formed from a first set of nonconductive threads interwoven with the first set of conductive threads, and the second textile layer is formed from a second set of nonconductive threads interwoven with the second set of conductive threads.

In accordance with another embodiment, the spacer structure is a monofilament yarn interwoven between the first and second textile layers.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. A system, comprising:
a portable electronic device;
a wearable fabric item having first conductive threads that form a touch sensor, second conductive threads that convey drive signals to the touch sensor, and a shielding layer interposed between the first conductive threads and the second conductive threads, wherein the touch sensor is configured to receive touch input; and
circuitry configured to apply the drive signals to the second conductive threads and to control the portable electronic device in response to the touch input.

2. The system defined in claim 1 wherein the portable electronic device is configured to output a notification and wherein the circuitry is configured to acknowledge receipt of the notification in response to the touch input.

3. The system defined in claim 2 wherein the portable electronic device is configured to provide audio output in connection with the notification and wherein the circuitry is configured to silence the audio output in response to the touch input.

4. The system defined in claim 1 wherein the circuitry is configured to initiate a message on the portable electronic device in response to the touch input.

5. The system defined in claim 4 wherein the message is selected from the group consisting of: an e-mail and a text message.

6. The system defined in claim 4 wherein the touch input comprises a gesture and wherein the message comprises a predetermined message based on the gesture.

7. The system defined in claim 1 wherein the circuitry is configured to place the portable electronic device in a do-not-disturb mode in response to the touch input.

8. The system defined in claim 1 wherein the circuitry is configured to place the portable electronic device in a secure mode in response to the touch input and wherein the portable electronic device is configured to require authentication when operated in the secure mode.

9. The system defined in claim 1 wherein the circuitry is configured to silence an alert on the portable electronic device in response to the touch input.

10. The system defined in claim 1 wherein the circuitry is configured to adjust a volume of audio output on the portable electronic device in response to the touch input.

11. The system defined in claim 1 wherein the wearable fabric item comprises a wrist band and wherein the touch sensor comprises a capacitive touch sensor configured to detect multiple touches.

12. A system, comprising:
an electronic device configured to provide audio output;
a wearable fabric band having first and second overlapping fabric layers, first threads in the first fabric layer that form a capacitive touch sensor, and second threads in the second fabric layer that convey drive signals to the capacitive touch sensor, wherein the capacitive touch sensor is configured to receive touch input; and
circuitry configured to apply the drive signals to the second threads and to control the audio output in response to the touch input.

13. The system defined in claim 12 wherein the circuitry is configured to silence the audio output in response to the touch input.

14. The system defined in claim 12 wherein the circuitry is configured to adjust a volume of the audio output in response to the touch input.

15. The system defined in claim 12 wherein the audio output comprises media playback and wherein the circuitry is configured to select a next track of the media playback in response to the touch input.

16. A system, comprising:
a mobile telephone;
a fabric wrist band configured to wirelessly communicate with the mobile telephone, wherein the fabric wrist band comprises:
nonconductive threads;
first conductive threads woven with the nonconductive threads and configured to form a touch sensor on the fabric wrist band; and
second conductive threads that overlap the first conductive threads and that convey drive signals to the touch sensor; and
circuitry configured to apply the drive signals to the second conductive threads and to control an operation of the mobile telephone based on touch input to the touch sensor.

17. The system defined in claim 16 wherein the circuitry is configured to place the mobile telephone in a do-not-disturb mode in response to the touch input.

18. The system defined in claim 16 wherein the circuitry is configured to place the mobile telephone in a secure mode in response to the touch input and wherein the mobile telephone is configured to require a pass code when operating in the secure mode.

19. The system defined in claim 16 wherein the mobile telephone is configured to send a text message in response to the touch input.

20. The system defined in claim 19 wherein the touch input comprises a gesture and wherein the text message comprises a predetermined message based on the gesture.

* * * * *